(12) United States Patent
Yeh

(10) Patent No.: US 7,962,999 B2
(45) Date of Patent: Jun. 21, 2011

(54) WHEEL SUSPENSION MECHANISM

(76) Inventor: Don-Lon Yeh, Taichung (TW)

( * ) Notice: Subject to any disclaimer, the term of this patent is extended or adjusted under 35 U.S.C. 154(b) by 420 days.

(21) Appl. No.: 12/207,504

(22) Filed: Sep. 10, 2008

(65) Prior Publication Data

US 2010/0059960 A1    Mar. 11, 2010

(51) Int. Cl.
*E05D 15/16* (2006.01)
*E05D 15/22* (2006.01)

(52) U.S. Cl. .............................................. 16/97; 16/89

(58) Field of Classification Search .................. 5/1, 601, 5/613, 617, 618, 81.1 HS; 16/89, 97, 102, 16/107
See application file for complete search history.

(56) References Cited

U.S. PATENT DOCUMENTS

| | | | | |
|---|---|---|---|---|
| 1,393,817 A | * | 10/1921 | Olson | 384/126 |
| RE18,247 E | * | 11/1931 | Edgar | 451/374 |
| 3,813,728 A | * | 6/1974 | Johnson | 16/97 |
| 4,141,106 A | * | 2/1979 | Dixon | 16/89 |
| 4,302,865 A | * | 12/1981 | Dixon et al. | 16/97 |
| 4,401,033 A | * | 8/1983 | Gerken | 104/94 |
| 6,581,242 B2 | * | 6/2003 | Owens | 16/89 |
| 2010/0059960 A1 | * | 3/2010 | Yeh | 280/124.125 |

* cited by examiner

*Primary Examiner* — Robert G Santos

(57) ABSTRACT

A wheel suspension mechanism includes an absorber having an outer sleeve. A support spindle is rotatably received in the outer sleeve and reciprocally moved relative to the outer sleeve. The support spindle has an annular flange radially extending from a middle section thereof to divide the support spindle into a first section and a second section. A flexible member is compressively sleeved on the first section and abuts against the annular flange of the support spindle for providing a cushion effect. A wheel assembly is connected to the second section of the support spindle of the absorber and the wheel assembly is rotatably slanted relative to the absorber for adapting to mesh with an uneven rail.

12 Claims, 9 Drawing Sheets

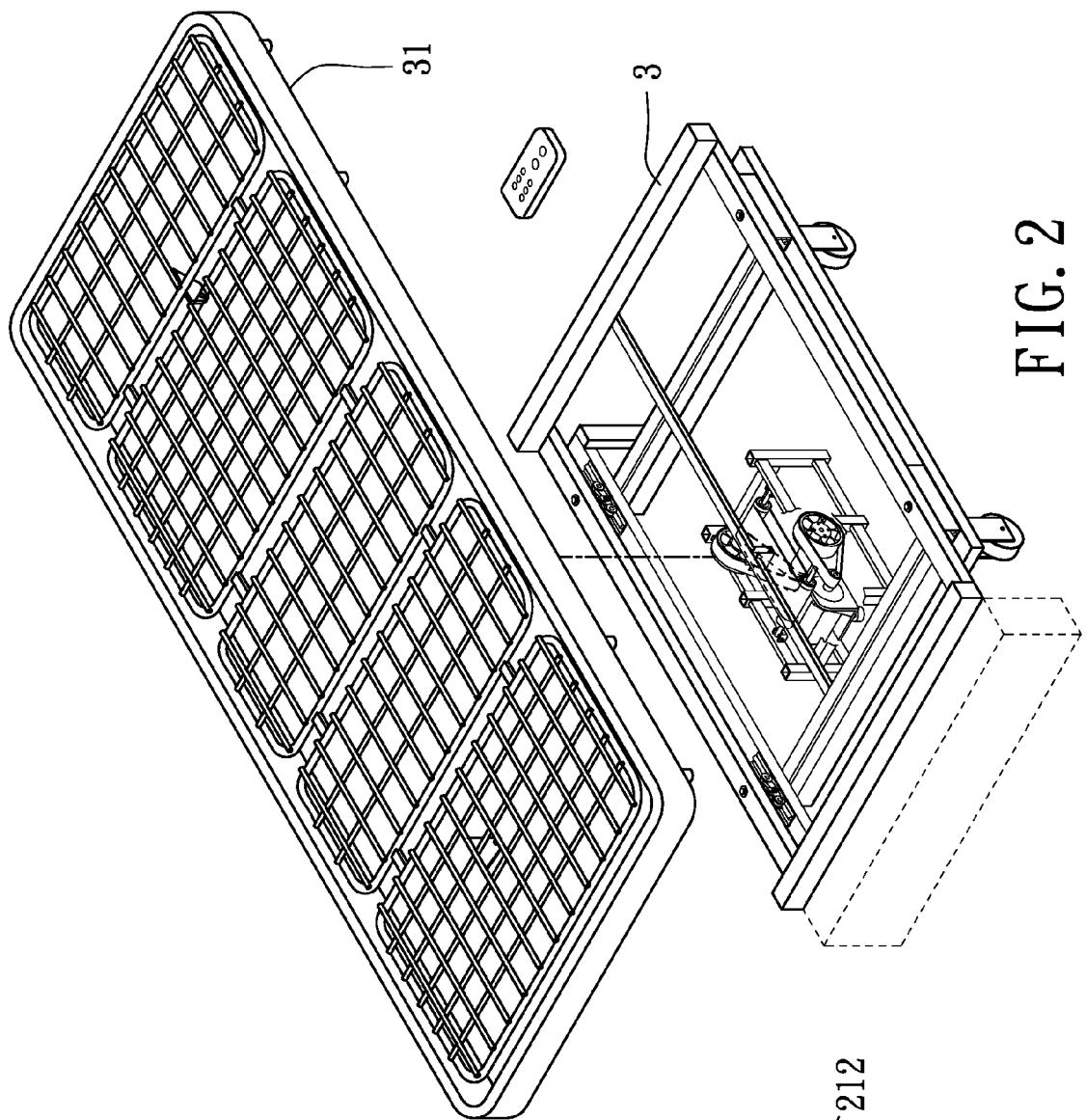
FIG. 2
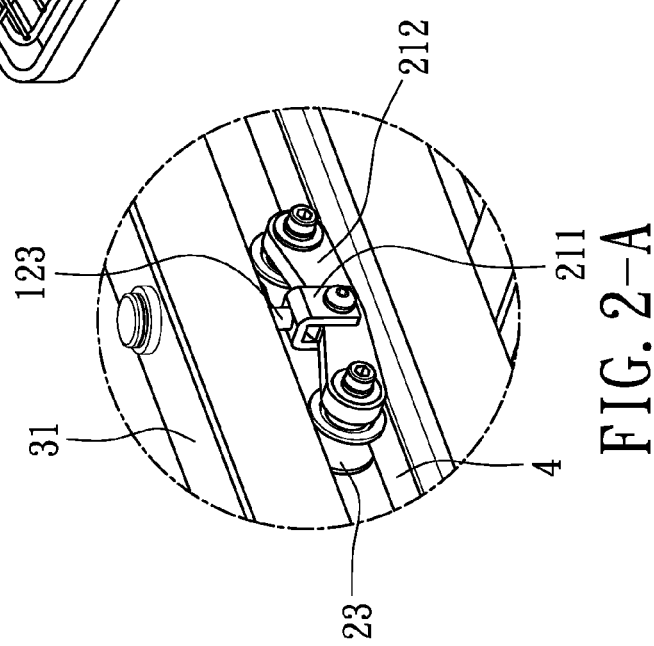
FIG. 2-A

WHEEL SUSPENSION MECHANISM

BACKGROUND OF THE INVENTION

1. Field of the Invention

The present invention relates to a wheel suspension mechanism, and more particularly to a wheel suspension mechanism for suiting with an uneven rail.

2. Description of Related Art

A conventional horizontal vibration mechanism in accordance with the prior art includes a base. A transmission system is mounted in the base. A movable rack is disposed on the base and driven by the transmission system. A mattress is mounted on the movable rack for supporting a user lying thereon. Four rails are mounted on the base. Four wheel sets are respectively and movably mounted on a corresponding rail. Each of the four wheel sets can slidably mesh the corresponding rail. Therefore, the transmission system drives the rack for providing a horizontal vibration and each of the four wheel sets slidably meshes the corresponding rail.

However, the rack and the base are usually formed with welding such that the rails are uneven to cause an error and the wheel sets of the conventional horizontal vibration mechanism are fixed on an underside of the rack. Therefore, the wheel sets couldn't properly and adjustably mesh with the rails such that the mattress is reciprocally moved with irregular shaking and the conventional horizontal vibration mechanism couldn't provide a smooth horizontal movement and makes a loud noise. The wheel sets will be worn improperly as described above. Furthermore, the wheel sets of the conventional horizontal vibration mechanism provides no cushion function such that the wheel sets may be easily broken due to the horizontal vibration after being used for a period of time.

The present invention has arisen to mitigate and/or obviate the disadvantages of the conventional horizontal vibration mechanism.

SUMMARY OF THE INVENTION

The main objective of the present invention is to provide an improved wheel suspension mechanism for adjustably suiting with an uneven rail.

To achieve the objective, the wheel suspension mechanism in accordance with the present invention comprises an absorber including an outer sleeve. A support spindle is rotatably received in the outer sleeve and the support spindle is rotated and reciprocally moved relative to the outer sleeve. The support spindle has an annular flange radially extending from a middle section thereof to divide the support spindle into a first section and a second section. A flexible member is compressively sleeved on the first section of the support spindle for providing a cushion effect. A wheel assembly is connected to a distal end of the second section of the support spindle of the absorber and the wheel assembly is rotatably slanted relative to the absorber for adapting to mesh with an uneven rail.

The absorber of the wheel suspension mechanism of the present invention effectively absorbs and reduces perpendicular waves form a horizontal vibration mechanism. Furthermore, the wheel assembly of the present invention is freely adjusted for meshing with the uneven rail such that a lateral movement of the wheel suspension mechanism is smooth.

Further benefits and advantages of the present invention will become apparent after a careful reading of the detailed description with appropriate reference to the accompanying drawings.

BRIEF DESCRIPTION OF THE DRAWINGS

FIG. 2 is a perspective schematic view of the wheel suspension mechanism assembled on a horizontal vibration mechanism;

FIG. 2A is a partial enlarged perspective view of the wheel suspension mechanism in FIG. 2;

DETAILED DESCRIPTION OF THE INVENTION

Figure 1:
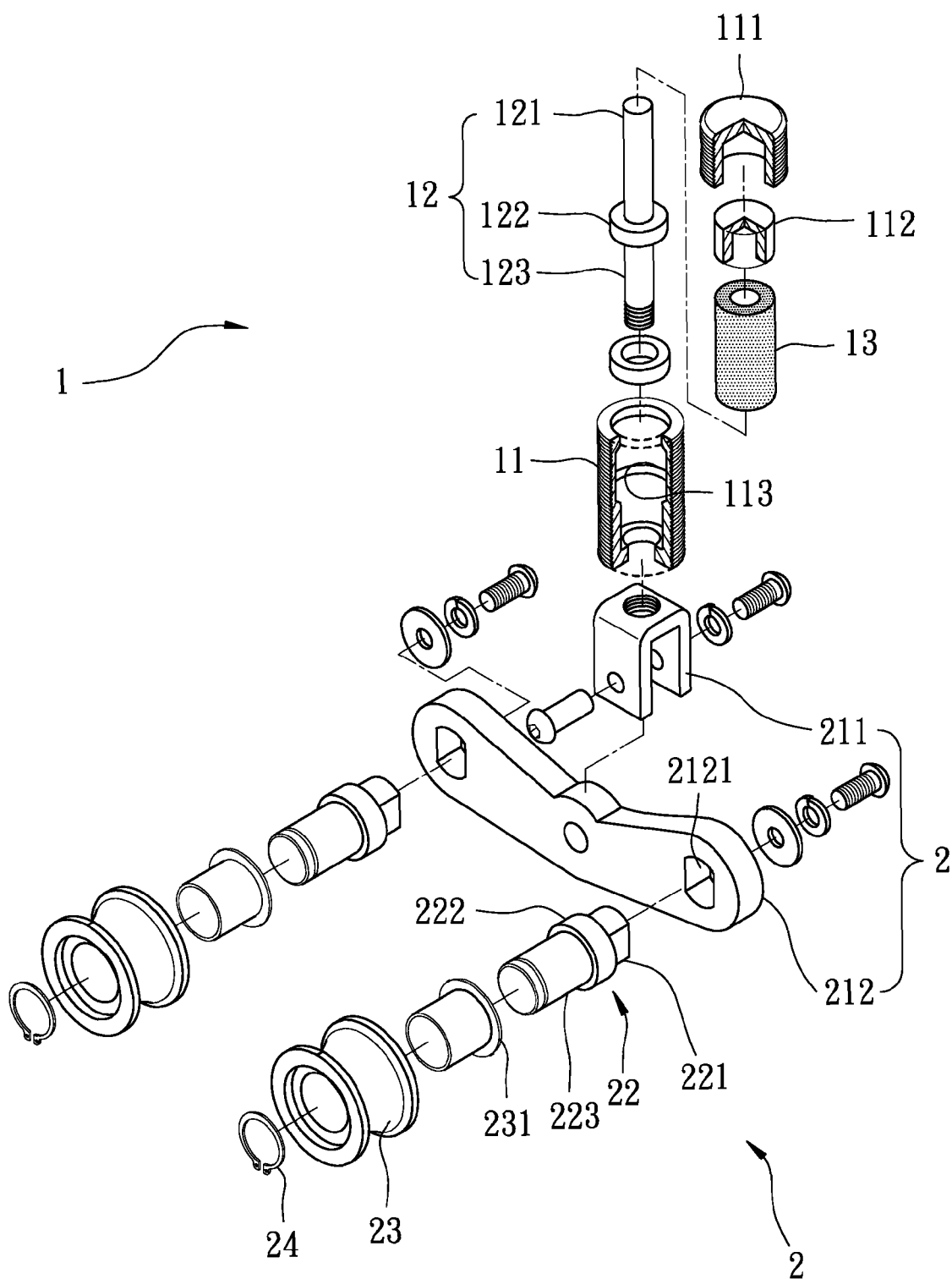
FIG. 1 is an exploded perspective view of a wheel suspension mechanism in accordance with the present invention.
Figure 3:
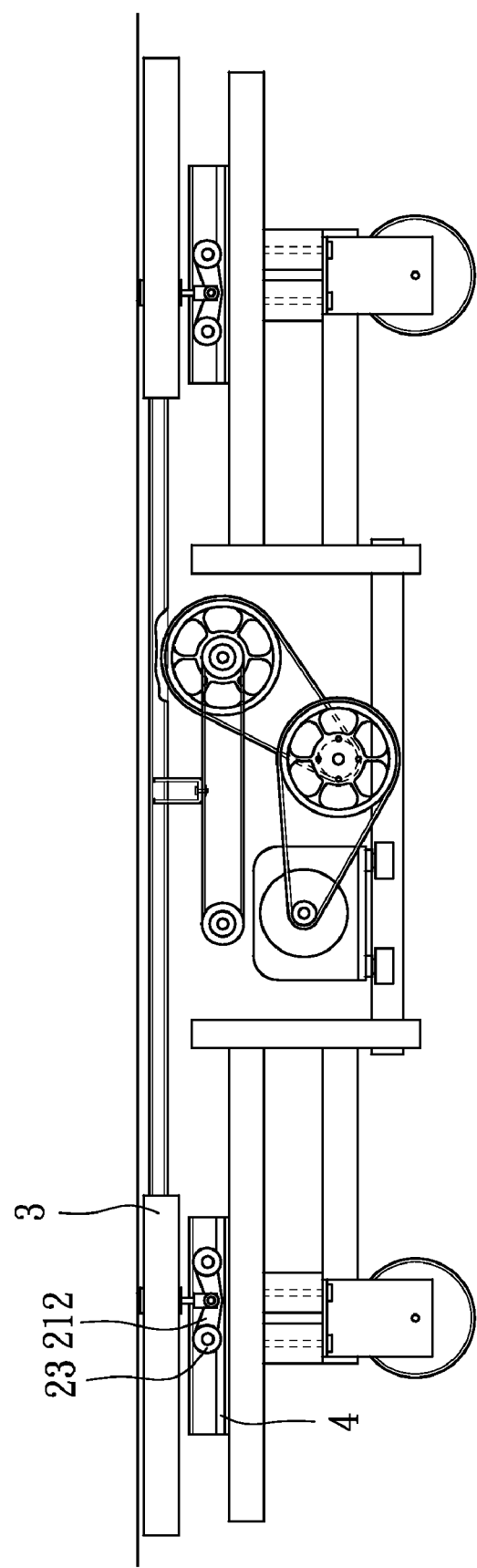
FIG. 3 and FIG. 4 are schematic views of the wheel suspension mechanism.
Figure 4:
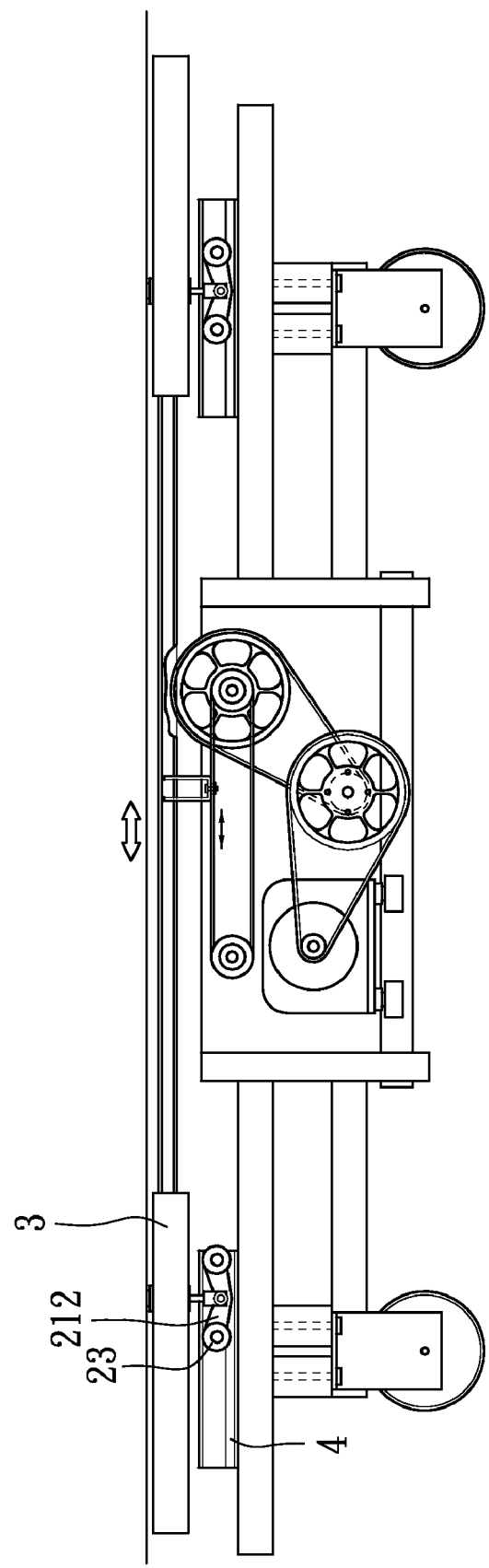
Figure 5:
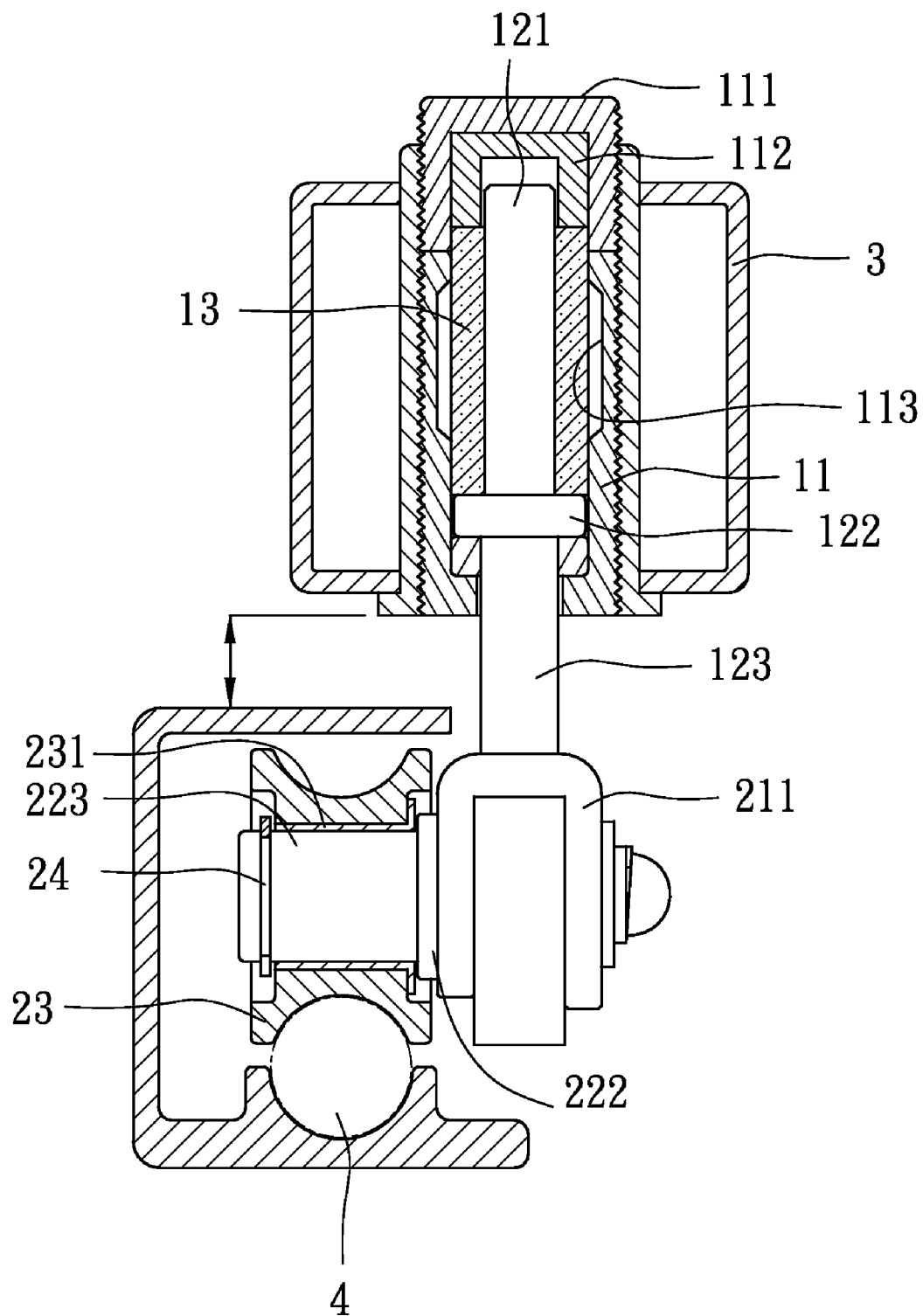
FIG. 5 is a partial cross-sectional view of an absorber and a wheel assembly of the wheel suspension mechanism in accordance with the present invention.

Referring to the drawings in FIGS. 1 and 5, a wheel suspension mechanism in accordance with the present invention comprises an absorber 1 and a wheel assembly 2 that is connected to the absorber 1.

The absorber 1 includes an outer sleeve 11, a washer (not numbered) received in a bottom of the outer sleeve 11, a support spindle 12 rotatably and reciprocally received in the outer sleeve 11 and extending through the washer, a hollow flexible member 13 sleeved on the support spindle 12, a pusher 112 mounted to the flexible member 13, and an cap 111 mounted on the pusher 112. The outer sleeve 11 has a threaded outer periphery for adapting to be mounted in a horizontal vibration mechanism 3 (shown in FIG. 2). The outer sleeve 11 has an annular recess 113 laterally defined in an inner periphery thereof for partially receiving the deformed flexible member 13 when the flexible member 13 is compressed. An annular flange 122 radially extends from a middle section of the support spindle 12 to divide the support spindle 12 into a first section 121 and a second section 123, wherein the second section 123 extends through the washer and the bottom of the outer sleeve 11. The flexible member 13 is compressively sleeved on the first section 121 of the support spindle 12 and abuts against the annular flange 122 for providing a cushion effect. The pusher 112 longitudinally abuts against the flexible member 13 and the cap 111 is coaxially sleeved on the pusher 112. The cap 111 is partially mounted into the horizontal vibration mechanism 3 and coaxially corresponds to the outer sleeve 11 to hold the flexible member 13 and the pusher 112 in place.

The wheel assembly 2 has a connecting set 21 including a base 212, and a seat 211 pivotally mounted to the base 212 and connected to a distal end of the second section 123 of the support spindle 12 such that the base 212 is selectively and rotatably slanted relative to the absorber 1. At least one shaft 22 is laterally and unrotatably mounted to the base 212. The shaft 22 has a stopper 222 radially extending therefrom to divide the shaft 22 into a first portion 221 and a second portion 223. The first portion 221 is laterally and unrotatably inserted into the base 212. A bushing 231 is longitudinally and rotatably sleeved on the second portion 223 of the shaft 22 and adjacent to the stopper 222. A wheel 23 is rotatably sleeved on the bushing 231 and rotated relative to the shaft 22. A width of the wheel 23 is smaller than a length of the second portion 223 of the shaft 22 such that the wheel 23 is axially movable relative to the shaft 22. The wheel 23 has a concaved outer periphery radially defined therein for complementally meshing with a rail 4. A C-shaped ring 24 is fixed on a distal end of the second portion 223 for preventing the wheel 23 and the bushing 231 from detaching from the second portion 223 of the shaft 22. In the preferred embodiment of the present invention, the seat 211 is pivotally connected to a middle of the base 212 and the base 212 has two non-round holes 2121 laterally defined in two opposite ends thereof such that there are two shafts 22 in this embodiment. The first portion 221 of each of the two shafts 22 is complementally and securely received in a corresponding one of the two non-round holes 2121.

With reference to FIG. 2, FIG. 2A, FIG. 3 and FIG. 4, multiple wheel suspension mechanisms of the present invention are adapted to be partially assembled in an underside of the horizontal vibration mechanism 3 and a rack 31 is mounted on the horizontal vibration mechanism 3 for supporting a user. As shown in FIG. 2A, there are two pairs of wheel suspension mechanisms for stably and horizontally supporting the rack 31. The horizontal vibration mechanism 3 provides a reciprocally horizontal effect such that the user (not shown) can lie on the rack 31 for massaging. The horizontal vibration mechanism 3 has two pairs of parallel rails 4 disposed therein and each wheel suspension mechanism of the present invention is reciprocally moved on a corresponding one of the four rails 4. Therefore, the absorber 1 of the wheel suspension mechanism of the present invention effectively absorbs and reduces perpendicular waves from the horizontal vibration mechanism 3. Furthermore, the wheel assembly 2 of the present invention is freely adjusted for meshing with the uneven rail 4 such that a lateral movement of the rack 31 is smooth.

Figure 6:
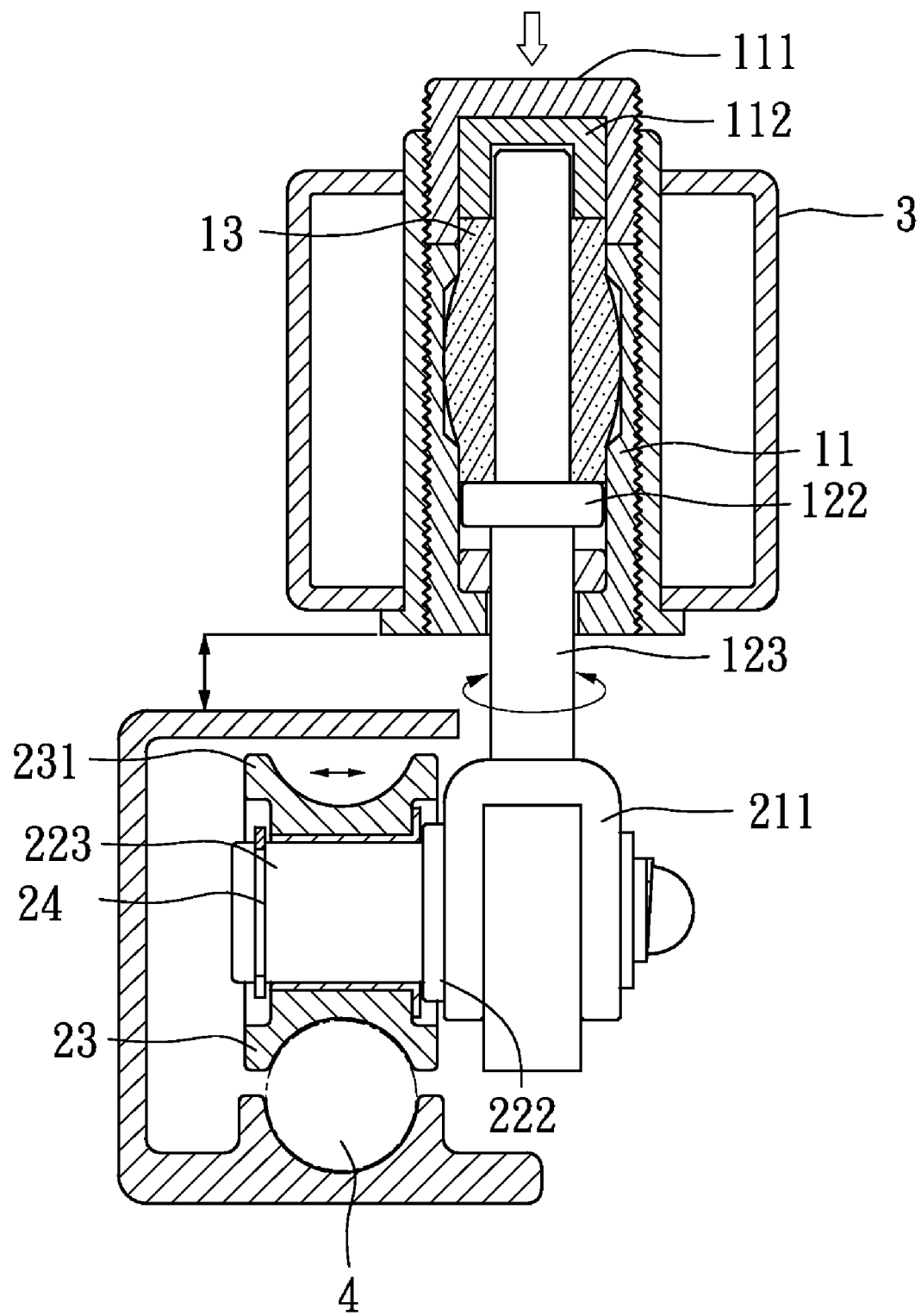
FIG. 6 and FIG. 7 are side operational views of the wheel suspension mechanism in FIG. 5.
Figure 7:
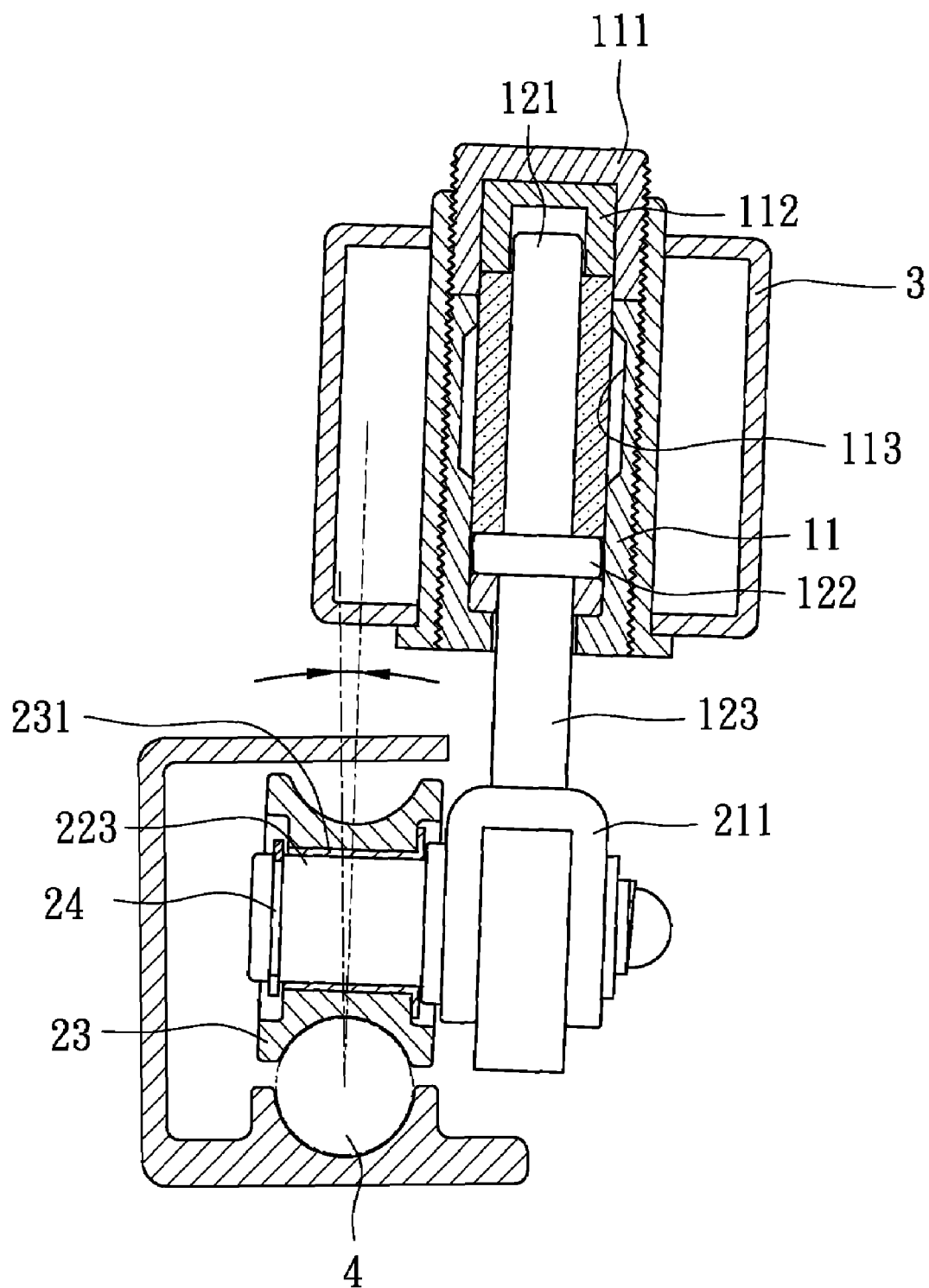

With reference to FIGS. 5-7, the width of the wheel 23 is smaller than the length of the second portion 223 of the shaft 22 such that the wheel 23 is axially movable relative to the shaft 22 for meshing with the uneven rail 4 even an unstraight rail 4. The distal end of the support spindle 12 is longitudinally connected to the seat 211 and the support spindle 12 is rotatable relative to the outer sleeve 11 such that the absorber 1 is rotatable relative to the wheel assembly 2 for suiting with the uneven rail 4. The flexible member 13 of the absorber 1 can be pressed by the annular flange 122 of the support spindle 12 to cause the flexible member 13 slightly deformed. The deformed part of the flexible member 13 is partially received in the annular recess 113 in the inner periphery of the outer sleeve 11 when the absorber 1 is downwardly compressed and the support spindle 12 is relatively upwardly moved to press the flexible member 13. As shown in FIG. 7, the outer periphery of the wheel 23 is concaved such that the wheel 23 can complementally mesh the uneven rail 4 pivotally relative to the rail 4 for suiting with the uneven rail 4.

Figures 8, 9:
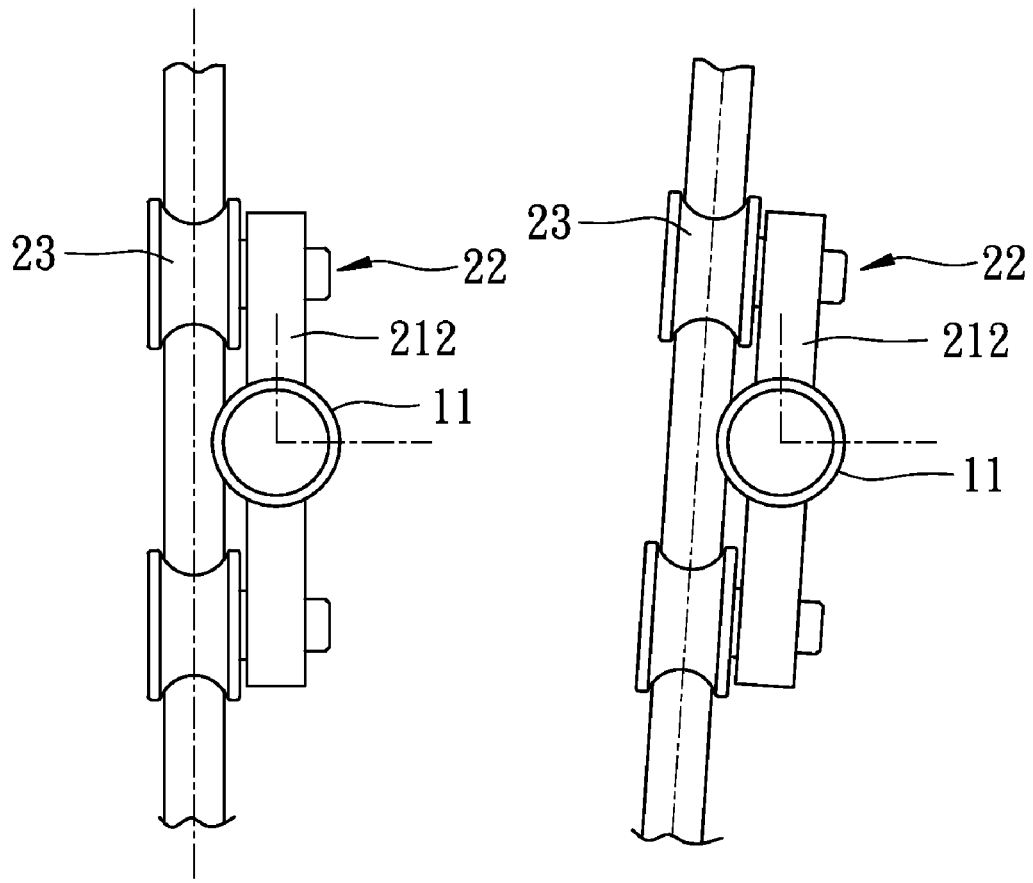
FIG. 8 is a top operational view of the wheel suspension mechanism in accordance with the present when the rails are parallel to each other.
FIG. 9 is a top operational views of the wheel suspension mechanism in accordance with the present when the rails are not parallel to each other.

With reference to FIG. 8 and FIG. 9, the absorber 1 is rotatably slanted relative to the wheel assembly 2 and the wheel 23 is axially moved relative to the shaft 22 such that the absorber 1 and the wheel assembly 2 are cooperated with each other to get fit with the uneven/unstraight rail 4.

Figure 10:
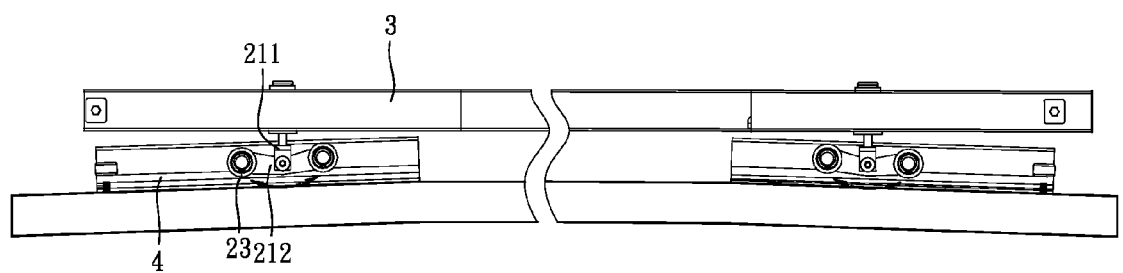
FIG. 10 is a side operational view of the wheel suspension mechanism in accordance with the present invention in a side direction when the rail is not horizontal.

With reference to FIG. 10, the base 212 of the connecting set 21 of the wheel assembly 2 is pivotally mounted to the seat 211 and the distal end of the second section 123 of the support spindle 12 is longitudinally connected to the seat 211 of the wheel assembly 2 such that the base 212 is pivoted relative to the absorber 1 for suiting with the rail 4 when the rail 4 is not horizontal.

Although the invention has been explained in relation to its preferred embodiment, it is to be understood that many other possible modifications and variations can be made without departing from the spirit and scope of the invention as hereinafter claimed.

What is claimed is:

1. A wheel suspension mechanism comprising:
    an absorber including an outer sleeve, a support spindle rotatably received in the outer sleeve and the support spindle rotated and reciprocally moved relative to the outer sleeve, the support spindle having an annular flange radially extending from a middle section thereof to divide the support spindle into a first section and a second section, a flexible member compressively sleeved on the first section of the support spindle and abutting against the annular flange of the support spindle for providing a cushion effect, the second section of the support spindle extending through a bottom of the outer sleeve; and
    a wheel assembly connected to the second section of the support spindle of the absorber and the wheel assembly rotatably slanted relative to the absorber for adapting to mesh with an uneven rail, the wheel assembly having a connecting set connected to a distal end of the second section of the support spindle, at least one shaft laterally mounted to the connecting set, the at least one shaft having a stopper radially extending therefrom to divide the at least one shaft into a first portion and a second portion, the first portion mounted to the connecting set, a wheel rotatably mounted to the second portion of the at least one shaft, a width of the wheel being smaller than a length of the second portion of the at least one shaft such that the wheel being axially moveable relative to the at least one shaft.

2. The wheel suspension mechanism for as claimed in claim 1, wherein the wheel assembly comprises a connecting set having a base and a seat pivotally mounted to the base, a distal end of the second section of the support spindle extending through a bottom of the outer sleeve and longitudinally connected to the seat such that the base of the wheel assembly is selectively and rotatably slanted relative to the absorber for adapting to suit with the uneven rail.

3. The wheel suspension mechanism for as claimed in claim 1, wherein the connecting set has a base and a seat pivotally connected to a middle of the base, the distal end of the second section of the support spindle longitudinally connected to the seat such that the base of the wheel assembly is selectively and rotatably slanted relative to the absorber for adapting to suit with the uneven rail, the first portion of the at least one shaft laterally and unrotatably inserted into two opposite ends of the base.

4. The wheel suspension mechanism as claimed in claim 1 further comprising a bushing longitudinally rotatably sleeved on the second portion of the at least one shaft and being adjacent to the stopper and the wheel rotatably sleeved on the bushing such that the wheel is rotated relative to the at least one shaft, a C-shaped ring fixed on a distal end of the second portion for preventing the wheel and the bushing from detaching from the second portion of the at least one shaft.

5. The wheel suspension mechanism as claimed in claim 1, wherein the absorber further comprises a pusher longitudinally abutting against the flexible member and a cap partially sleeved on the pusher for holding the flexible member and the pusher in place.

6. The wheel suspension mechanism as claimed in claim 2, wherein the absorber further comprises a pusher longitudinally abutting against the flexible member and a cap partially sleeved on the pusher for holding the flexible member and the pusher in place.

7. The wheel suspension mechanism as claimed in claim 3, wherein the absorber further comprises a pusher longitudinally abutting against the flexible member and a cap partially sleeved on the pusher for holding the flexible member and the pusher in place.

8. The wheel suspension mechanism as claimed in claim 4, wherein the absorber further comprises a pusher longitudinally abutting against the flexible member and a cap partially sleeved on the pusher for holding the flexible member and the pusher in place.

9. The wheel suspension mechanism for as claimed in claim 1, wherein the outer sleeve has an annular recess laterally defined in an inner periphery thereof for partially receiving the deformed flexible member when the flexible member is compressed.

10. The wheel suspension mechanism for as claimed in claim 2, wherein the outer sleeve has an annular recess laterally defined in an inner periphery thereof for partially receiving the deformed flexible member when the flexible member is compressed.

11. The wheel suspension mechanism for as claimed in claim 3, wherein the outer sleeve has an annular recess laterally defined in an inner periphery thereof for partially receiving the deformed flexible member when the flexible member is compressed.

12. The wheel suspension mechanism for as claimed in claim 4, wherein the outer sleeve has an annular recess laterally defined in an inner periphery thereof for partially receiving the deformed flexible member when the flexible member is compressed.

* * * * *